April 10, 1973　　M. S. MITCHAM ET AL　　3,726,655

APPARATUS AND METHOD FOR ATTENUATING MINERAL FIBERS

Filed Nov. 27, 1970

INVENTORS
MICHAEL S. MITCHAM &
BY RICHARD A. PREGNALL

*Staelin & Overman*
ATTORNEYS

3,726,655
APPARATUS AND METHOD FOR ATTENUATING MINERAL FIBERS

Michael S. Mitcham, Granville, Ohio, and Richard A. Pregnall, Columbia, S.C., assignors to Owens-Corning Fiberglas Corporation
Filed Nov. 27, 1970, Ser. No. 93,312
Int. Cl. C03b 37/02
U.S. Cl. 65—1
11 Claims

ABSTRACT OF THE DISCLOSURE

An improved apparatus for attenuating mineral fibers from a liquid melt. The apparatus includes a furnace block having an interior trough for the liquid melt which extends through the lower surface thereof. A removable bushing support is clamped to the lower surface of the furnace block with an interior flared opening leading downwardly from the trough to a plurality of bushing orifices in its lower surface. Adjacent the interface between the furnace block and the bushing support and along the sides of the passage through the block are cooling pipes which are filled with cooling liquid when the bushings and their support structure are to be removed for repair or replacement. The cooling liquid in the pipes is effective to locally freeze off and solidify the melt in the passage across the interface to permit bushing support structure removal out thermal disturbance of the remainder of the installation.

---

This invention pertains to a construction for a melting apparatus for the attenuation of mineral fibers and particularly to a furnace and bushing installation which is used to attenuate glass fibers from a liquid melt of glass.

Typical commercial installations for the production of glass fibers from molten glass include a furnace or forehearth for melting the glass batch with liquid passages leading to a plurality of bushing installations which are used for fiber formation. The bushing orifices themselves, which are made of precious metal such as platinum, require repair or replacement at certain intervals which necessitates that the molten glass being supplied to that bushing installation be shut off or frozen off so that the bushing plate and orifices can be removed. In a multiple bushing installation, it is undesirable to shut down the entire furnace which would consequently stop production at all the bushings while one is being serviced. Consequently, there have been efforts to freeze off the glass passage to an individual bushing while attempting to maintain normal operation of the other bushings connected with that furnace.

It has been the practice in prior art to quench and cool the external areas adjacent the particular bushing to be changed with cold water in order to freeze off the molten glass being supplied to that bushing. Once this has been done, the bushing block and bushing itself can be removed and serviced or exchanged. As will be subsequently explained, this procedure is slow, and subjects large parts of the furnace installation to severe thermal shock. It is also necessarily time consuming in that a large portion of the ceramic and other parts of the installation surrounding the bushing must be cooled down and then returned to operating temperature. In addition, the lack of a precise cooling technique has caused problems because portions of the ceramic in the glass passage are disturbed and flake off into the passage. These particles are subsequently forced through the bushing orifices and will plug or distort them. Because of the temperature precision necessary for the attenuation of fine fibers, it has often taken as long as ten to fourteen days to complete the changeover of a bushing, which results in a vast reduction in output capacity.

It is an object of this invention to provide a simple system for selectively chilling portions of a furnace installation immediately adjacent the bushing to be serviced so that that bushing can be repaired or exchanged with a minimum of down time and thermal shock to the remainder of the installation.

It is another object of this invention to provide a built in cooling system which selectively applies a cooling fluid with a controllable cooling gradient to the areas of the furnace installation adjacent the bushing to be serviced, without disturbing other bushings in that installation and without thermally disturbing a large area of the furnace refractory.

Other objects and advantages of the invention will be apparent from the following description of a preferred embodiment thereof, with reference being made to the drawings in which.

In the following description, the operation of the apparatus and method of this invention are described with reference to what is known as a "direct melt" type furnace. However, the principles of this invention are applicable to all types of melting units and the advantages enumerated below are inherent in all such installations.

Figure 1:
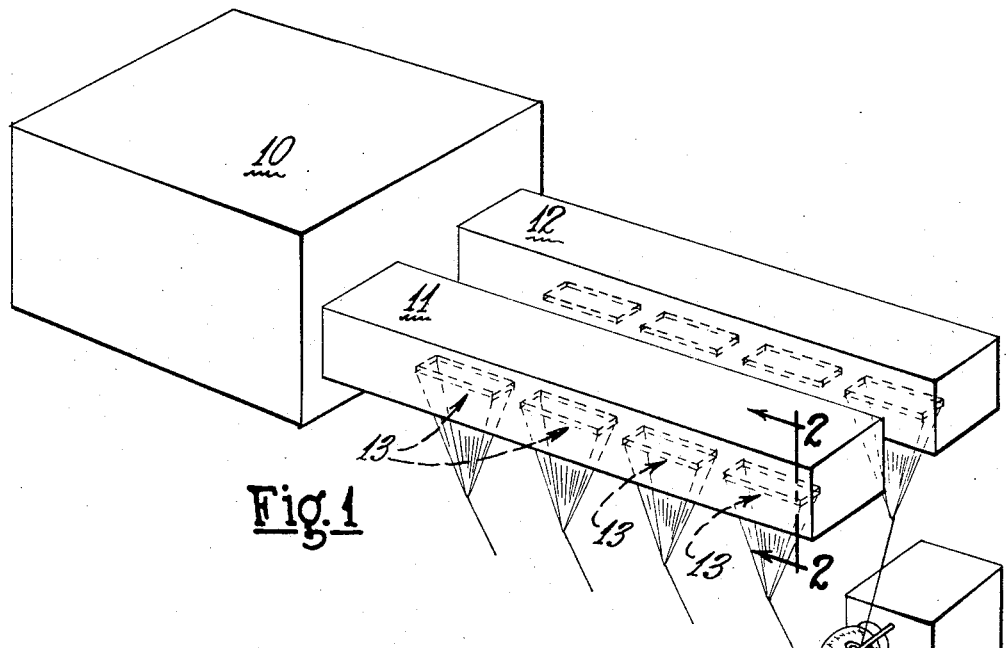
FIG. 1 is a schematic view in perspective of a multiple bushing furnace for the production of glass fibers of the furnace type which would be utilized with the invention of this application.
Figure 2:
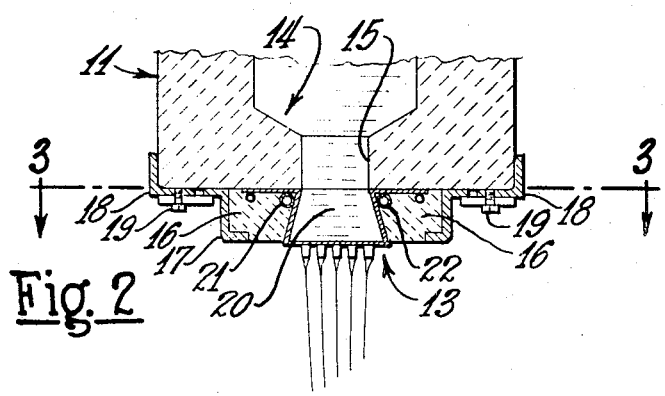
FIG. 2 is a cross sectional view in elevation of a portion of one of the bushings shown in the installation of FIG. 1, as would be seen along line 2—2 of FIG. 1, illustrating the details of the invention of this application.

Referring first to FIG. 1, the furnace installation schematically shown is of the direct melt type which includes a forehearth 10 and a pair of elongate furnace blocks 11 and 12 which have interior passages or troughs containing the molten glass. Each of the furnace blocks 11 and 12 have four separate bushings 13, each of which includes a plurality of bushing orifices formed of precious metal as seen in FIG. 2. Fibers formed by attenuation through the bushings 13 are cooled and collected in a conventional manner as by a winder as shown.

Referring to FIG. 2, the furnace block 11 has an interior trough 14 having an upper enlarged portion and reduced neck 15 extending through the lower surface of the furnace block 11. Secured to the underside of the furnace block 11 is the removable bushing block, which consists of the precious metal bushing orifices 13 surrounded by castable bushing refractory designated by reference numeral 16 as is conventional with installations of this type. A bushing frame 17 supports the refractory casting 16 and the bushing 13 and has a pair of flanges 18 which are removably secured, as by bolts or clamps 19 to the lower surface of the furnace block 11. Above the orifices 13 is a flared opening 20 which, with the neck 15 in the furnace block 11, forms the passage for molten glass from the furnace trough 14 to the bushing orifices 13.

Figure 3:
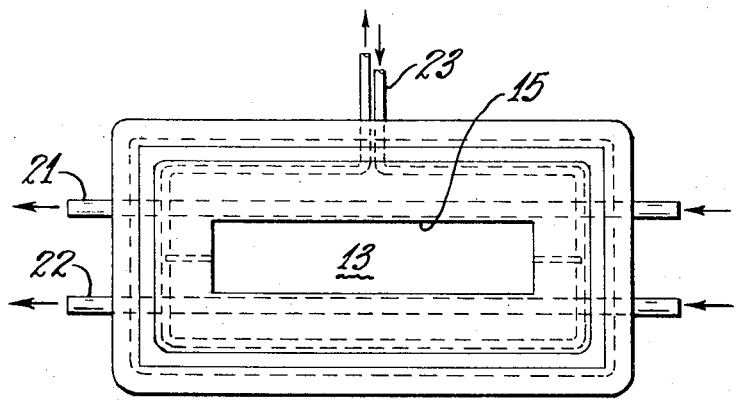
FIG. 3 is a plan view of the bushing installation of this invention, taken along line 3—3 of FIG. 2.

Referring next to FIG. 3, a pair of fluid conduits 21 and 22, also seen in FIG. 2, extend through the ceramic refractory material 16 closely adjacent the interface between the furnace block 11 and the bushing block 6 and closely adjacent the sides of the flared passage 20. These fluid conduits 21 and 22, in this illustrated preferred embodiment, consists of fluid impervious ceramic tubes or pipes which extend through apertures bored in the castable refractory 16. Other temperature resistant conduit materials could be constituted for the ceramic tubes and the fluid conduit could be the aperture or hole extending through the castable block 16 as long as the walls are fluid impervious. The nature of the fluid conduit itself does not constitute a part of this invention.

FIG. 3 also shows a second fluid pipe 23 which extends entirely around the glass passage to the bushing in a loop and lies closely adjacent the interface between the bushing block and furnace block 11 but spaced outwardly from the position of the fluid conduits 21 and 22. The fluid pipe 23 which loops entirely around the glass passage provides a thermal seal which is used to prevent molten glass from leaking between the interface between the bushing block and the furnace block 11. Chilling fluid through this pipe 23 solidifies any liquid glass that might seep outwardly through the interface but does not affect the performance of the melt nor is it capable of freezing off the glass in the neck 15 of the fluid passage.

As previously explained, the prior art method of shutting down a particular bushing would be to quench the entire external area, as with water through a hose, until the molten glass in the narrowest portion of the passage, such as the neck 15, became solidified. Once this was done, the bushing block would be removed by removal of the clamps 15 and the entire installation would be replaced. This, in addition to presenting a large thermal shock to the portion of the furnace and bushing block being quenched, required extensive chipping and scraping of the glass to provide a surface for the new bushing being added and thermal disturbed the performance of adjacent installations.

With construction of the instant invention, when it is desired to remove a bushing block for service or replacement, it is necessary only to initiate the flow of a cooling fluid through the fluid conduits 21 and 22, as by turning on a valve connected to a chilled fluid supply, such as cold water. Because of the position of the conduits 21 and 22 directly adjacent the interface between the furnace block 11 and bushing block and adjacent to the edges of the passageway, the position of freeze off or glass solidification will be exactly where wanted. Also, the heat transfer will come directly from the glass being chilled and not as much from other areas which need not be chilled, such as from the castable refractory portions 16 or other portions of the furnace. Thus the chilling of the glass passage is precisely where desired and is much more localized and rapid than is the previous method.

As soon as the glass in the passage has been solidified, which can be visually indicated or detected by appropriate temperature sensing devices, the bushing installation is removed and changed as before, resulting in a much speedier changeover. There is practically no disturbance to adjacent bushings because the chilling effect is so localized and precisely placed, and the amount of necessary chipping and refinishing of the surfaces is also reduced. In addition, the rate of cooling can be precisely varied to suit any particular installation by controlling the temperature and flow rate of the fluid in the conduits 21 and 22.

Using an installation of the type described in this preferred embodiment, it has been found that the temperature drop in the molten glass above the bushing, in the main passages through the furnace blocks 11 and 12 is, reduced to 20–30° F. versus the previous temperature reduction of 75° F. This means, of course, that the glass flowing to other bushings in the same installation is not nearly as much affected. Also, as a result of the precise cooling made possible by this invention, the satisfactory performance of the bushing can be reattained in a much smaller time since the adjacent parts can again be brought up to temperature of full performance in a matter of several days, as opposed to ten days to two weeks. The importance of these economies and times gained in a changeover procedure is particularly acute when extremely fine fibers of high temperature glasses are being produced which is the trend current in the industry. In addition, because of the positioning of the cooling conduits 21 and 22, the control or rate with which a bushing installation is cooled can be precisely varied, by varying the temperature gradient in the cooling water as it is flowed through these conduits. Such a procedure would have been impossible with the prior art methods of external quenching which were inaccurate due to the unpredictable nature of the heat transferred through the external ceramic parts surrounding the glass passage.

It will be apparent that the principles of this invention may be applied to all types of fiber attenuation apparatuses and to other melting units for the purpose of locally and quickly chilling off a molten stream to facilitate downstream inspection, repair, etc. Other advantages of the instant invention will be apparent to those skilled in the art and certain variations may be made without departing from the scope of the following claims.

We claim:
1. An apparatus for attenuating mineral fibers from a liquid melt comprising, in combination, an upper member having an interior trough for the liquid melt extending through its lower surface, a bushing support member removably secured to said lower surface with an interior opening in alignment with said trough and extending downwardly to an array of bushing orifices in the lower surface of said support member whereby said mineral melt can pass downwardly through the passage formed by said trough and opening through said orifices to form fibers, a cooling pipe adjacent the interface between said upper member and support member and extending immediately adjacent and parallel to the side of said passage in close thermal relation therewith, and means for flowing a cooling fluid through said pipe to locally freeze off and solidify the melt in said passage adjacent said interface.

2. The apparatus of claim 1 wherein said cooling pipe extends through said removable support member.

3. The apparatus of claim 1 wherein said interior opening in said removable support member is flared outwardly with its narrowest portion adjacent said interface and said cooling pipe.

4. The apparatus of claim 1 wherein said cooling pipe extends immediately adjacent and parallel to each side of said passage adjacent said interface.

5. The apparatus of claim 1 wherein said support member includes a flared passage having its narrowest portion adjacent said interface, a cermic body extending long each side of said passage with said cooling pipe extending through said ceramic body adjacent said interface.

6. The apparatus of claim 5 wherein said cooling pipe is a fluid impervious ceramic tube extending within an aperture in said ceramic body.

7. An improved bushing installation for use with a furnace in converting molten glass into glass fibers by attenuation through bushing orifices, comprising, in combination, an elongate furnace block of a ceramic material having an interior elongate trough extending through its lower surface for containing molten glass, a ceramic bushing block removably secured to said lower surface with an elongate interior opening therein extending downwardly to an array of bushing orifices below said trough and opening whereby molten glass in said trough will pass downwardly through the elongate passage formed by said trough and opening through said orifice array to form glass fibers, at least one conduit for cooling fluid positioned within said ceramic bushing block adjacent the interface between said furnace trough and bushing block and extending immediately adjacent and parallel to the side of said glass passage in close thermal relation therewith, and means for flowing a cooling fluid through said pipe to locally freeze off and solidify the melt across said passage adjacent said interface.

8. The improved bushing construction of claim 7 wherein said cooling pipe extends lengthwise on each side of said glass passage.

9. The improved bushing construction of claim 7 wherein said cooling pipe is a fluid impervious ceramic tube extending within an aperture in said ceramic bushing block.

10. A method of effecting shut-down and servicing of portions of an apparatus for attenuating glass fibers which supplies molten glass from a heating zone through a passage to a zone of attenuation, said method comprising the steps of removing heat from a localized area of said apparatus adjacent said passage until the glass in said passage adjacent said localized zone solidifies to stop flow through said passage and thence separating said zone of attenuation from said heating zone along a plane of separation extending through said solidified glass in said passage.

11. A method of effecting the shut-down and disassembly of an apparatus for attenuating mineral fibers from a liquid melt having an upper member with an interior trough for the liquid melt extending downwardly through its lower surfaces, a lower member removably secured to said lower surface of said upper member with an interior opening in alignment with said trough and extending downwardly to an array of bushing orifices in the lower surface of said lower member to form a glass passage therethrough, and cooling means adjacent the interface between said upper and lower members alongside said passage, said method comprising the steps of removing heat from a localized area adjacent said cooling means to solidify the molten material in said passage adjacent said interface and thence separating said upper and lower members along said interface.

References Cited

UNITED STATES PATENTS

| | | | |
|---|---|---|---|
| 2,165,318 | 7/1939 | Thomas et al. | 65—12 X |
| 3,164,458 | 1/1965 | Mitchell | 65—12 |
| 3,492,104 | 1/1970 | Glaser | 65—12 X |
| 2,714,622 | 8/1955 | McMullen | 65—356 X |

ROBERT L. LINDSAY, Jr., Primary Examiner

U.S. Cl. X.R.

65—2, 11 W, 27, 327, 356